US012565114B2

(12) United States Patent
Hasch

(10) Patent No.: US 12,565,114 B2
(45) Date of Patent: Mar. 3, 2026

(54) HIGH-VOLTAGE SYSTEM FOR A MOTOR VEHICLE, COMPRISING PASSIVE DISCHARGE CIRCUITS FOR Y-CAPACITORS

(71) Applicant: Bayerische Motoren Werke Aktiengesellschaft, Munich (DE)

(72) Inventor: Peter Hasch, Neuching (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 18/879,320

(22) PCT Filed: Aug. 24, 2023

(86) PCT No.: PCT/EP2023/073198
§ 371 (c)(1),
(2) Date: Dec. 27, 2024

(87) PCT Pub. No.: WO2024/056339
PCT Pub. Date: Mar. 21, 2024

(65) Prior Publication Data
US 2026/0001428 A1      Jan. 1, 2026

(30) Foreign Application Priority Data
Sep. 16, 2022    (DE) ..................... 10 2022 123 754.0

(51) Int. Cl.
*B60L 53/62*          (2019.01)
*B60L 3/00*          (2019.01)

(52) U.S. Cl.
CPC ............. *B60L 53/62* (2019.02); *B60L 3/0046* (2013.01)

(58) Field of Classification Search
CPC ............................... B60L 53/62; B60L 3/0046
See application file for complete search history.

(56) References Cited

U.S. PATENT DOCUMENTS 11,607,959 B2 *   3/2023   Sakata ..................... B60L 58/20
12,057,732 B2 *   8/2024   Wang .................... B60L 3/0046
(Continued)

FOREIGN PATENT DOCUMENTS

CA              572726   A       3/1959
DE   10 2015 016 000   A1      8/2016
(Continued)

OTHER PUBLICATIONS

International Search Report (PCT/ISA/210) issued in PCT Application No. PCT/EP2023/073198 dated Dec. 5, 2023 with English translation (6 pages).
(Continued)

*Primary Examiner* — Rexford N Barnie
*Assistant Examiner* — Michael J Warmflash
(74) *Attorney, Agent, or Firm* — Crowell & Moring LLP

(57)          ABSTRACT

A high-voltage system for a motor vehicle may include: an electric high-voltage energy storage device; a high-voltage onboard electrical system having onboard electrical system-side HV connections and a capacitor assembly comprising an X-capacitor and two Y-capacitors; a switching device connected to the high-voltage energy storage device and the high-voltage onboard electrical system; and a discharge device for discharging the capacitor assembly, having a discharge resistor connected to the onboard electrical system and a passive discharge circuit per Y-capacitor, wherein the discharge circuits discharge the Y-capacitors, and each discharge circuit has a diode poled in a blocking direction dropping at the Y-capacitors when the switching device is closed, and a diode of one discharge circuit is poled in the passage direction, resulting from the charging of the Y-capacitors and the potential coupling of the onboard electrical system-side HV connections caused by the discharge resistor, in order to discharge the Y-capacitors.

8 Claims, 2 Drawing Sheets

(56)               References Cited

U.S. PATENT DOCUMENTS

| | | | |
|---|---|---|---|
| 2007/0114077 A1* | 5/2007 | Goetz .................. B60L 3/0069 | |
| | | | 180/54.1 |
| 2013/0195497 A1* | 8/2013 | Shimura ............... G03G 15/80 | |
| | | | 399/88 |
| 2017/0047758 A1* | 2/2017 | Chatroux ............. H02J 7/0068 | |
| 2020/0223315 A1* | 7/2020 | Binder ...................... B60L 3/04 | |
| 2023/0226953 A1* | 7/2023 | Pfeilschifter ........... B60L 50/60 | |
| | | | 320/127 |
| 2024/0036078 A1* | 2/2024 | Aurand ..................... B60L 3/04 | |
| 2024/0088703 A1* | 3/2024 | Wang ................... B60L 3/0046 | |
| 2024/0410926 A1* | 12/2024 | Maier .................... B60L 53/62 | |

FOREIGN PATENT DOCUMENTS

| | | | |
|---|---|---|---|
| DE | 10 2019 202 892 A1 | 9/2020 | |
| DE | 10 2020 207 972 A1 | 10/2020 | |
| DE | 10 2020 111 454 A1 | 10/2021 | |
| DE | 10 2020 006 919 A1 | 1/2022 | |

OTHER PUBLICATIONS

German-language Written Opinion (PCT/ISA/237) issued in PCT Application No. PCT/EP2023/073198 dated Dec. 5, 2023 with English translation (10 pages).
German-language Search Report issued in German Application No. 10 2022 123 754.0 dated Jul. 11, 2023 with partial English translation (11 pages).
German-language Office Action issued in German Application No. 10 2022 123 754.0 dated Nov. 15, 2023 (4 pages).

* cited by examiner

HIGH-VOLTAGE SYSTEM FOR A MOTOR VEHICLE, COMPRISING PASSIVE DISCHARGE CIRCUITS FOR Y-CAPACITORS

BACKGROUND AND SUMMARY

The invention relates to a high-voltage system for a motor vehicle. The high-voltage system comprises a high-voltage electrical energy store with store-side HV terminals, a high-voltage on-board electrical system having on-board electrical system-side HV terminals, and a capacitor assembly. The capacitor assembly comprises an X-capacitor, which is connected to the on-board electrical system-side HV terminals, and two Y-capacitors, which are respectively connected to one of the on-board electrical system-side HV terminals and to a ground potential of the high-voltage system. The high-voltage system further comprises a switching device which, for the interconnection of the high-voltage energy store and the high-voltage on-board electrical system, is connected to the store-side and on-board electrical system-side HV terminals, and a discharge device for discharging the capacitor assembly. The invention moreover relates to a motor vehicle having a high-voltage system.

The focus of interest in the present case are high-voltage systems for electrified motor vehicles, i.e. for example, electric vehicles, hybrid vehicles and fuel cell vehicles. High-voltage systems of this type customarily comprise a high-voltage energy store, which is designed for supplying high-voltage components, for example an electric drive machine, on a high-voltage on-board electrical system of the motor vehicle. The high-voltage on-board electrical system can also incorporate a charging terminal, by means of which the high-voltage energy store can be connected, for charging, to an off-board charging station. HV potential-carrying HV terminals of the high-voltage energy store are customarily connected by means of a switching device which, for example, can comprise contactors, to HV terminals of the high-voltage on-board electrical system. By means of this switching device, the high-voltage on-board electrical system can be disconnected, wherein the high-voltage energy store, in particular, is galvanically isolated from the high-voltage on-board electrical system.

The high-voltage on-board electrical system moreover comprises capacitors which are incorporated, either deliberately, in the form of interference-suppression capacitors, or parasitically, for example as a result of structural arrangements, in the high-voltage on-board electrical system. The X-capacitor, in the closed state of the switching device, is connected to HV terminals, i.e. to a positive pole and a negative pole, of the high-voltage energy store. Y-capacitors, in the closed state of the switching device, are respectively connected to one of the HV terminals and to a ground potential, the so-called vehicle ground. The on-board electrical system-side and store-side HV terminals, aside from closely monitored parasitic insulation resistances, have no electrical connection to the ground potential. Moreover, a discharge resistor is customarily required, which is parallel-connected to the X-capacitor and is designed for discharging the X-capacitor, for example further to the opening of the switching device. Any endangerment of persons by contact with both HV potentials, associated with the high-voltage energy store and the X-capacitor, can be excluded accordingly.

However, the electrical connection of HV terminals to the vehicle ground via the Y-capacitors is problematic. In order to prevent any endangerment of persons associated with contact with only one HV potential, the deliberately incorporated Y-capacitors can be rated such that, for example, the capacitance thereof is reduced to the extent that the total energy content of Y-capacitors does not exceed a stipulated threshold value. However, in the case of interference-suppression capacitors, this impacts negatively upon EMC behavior in the high-voltage on-board electrical system. Moreover, for the rating of Y-capacitors, a voltage which is applied to the Y-capacitors and which influences the energy content thereof must be taken into consideration. However, this voltage is influenced by the parasitic insulation resistances, in particular by an age-related variation in the ratio of insulation resistances and a potentially associated load imbalance, such that the total energy content of Y-capacitors, depending upon the extent of the load imbalance, can exceed the stipulated threshold value.

To this end, DE 10 2020 006 919 A1 proposes that information with respect to such a load imbalance should be determined and that, for this purpose, a characteristic variable for the quantity of energy in Y-capacitors be defined. The characteristic variable can be, for example, a voltage, a voltage ratio, a ratio of insulation resistances, or similar. In the event that a load imbalance has been detected, measures can be implemented. A measure of this type can be, for example, the disconnection of the high-voltage on-board electrical system or the reduction of voltage on the Y-capacitors, for example by means of a discharge device. The method disclosed in the prior art is complex in that, firstly, it is necessary to determine the load imbalance, in order to infer an appropriate measure herefrom. Disconnection of the high-voltage on-board electrical system by opening the switching device can, moreover, be ineffective, if the Y-capacitors continue to be charged via high-resistance parasitic connections between the high-voltage energy store and the high-voltage on-board electrical system. A high-resistance connection of this type can be formed, inter alia, by age-related particle deposits in a contactor housing, or via a monitoring device for monitoring switching processes of the contactor, for example a so-called contact sticking detector.

An object of the present invention is the provision of a simple, cost-effective and reliable solution for reducing a quantity of energy in the Y-capacitors of a high-voltage on-board electrical network of a motor vehicle.

This object is fulfilled, according to some implementations of the invention, by a high-voltage system and by a motor vehicle having the features claimed in the respective independent patent claims. Advantageous embodiments of the invention are the subject matter of the dependent patent claims, the description and the figures.

A high-voltage system according to the invention for a motor vehicle comprises a high-voltage electrical energy store with store-side HV terminals, a high-voltage on-board electrical system having on-board electrical system-side HV terminals, and a capacitor assembly. The capacitor assembly comprises an X-capacitor, which is connected to the on-board electrical system-side HV terminals, and two Y-capacitors, which are respectively connected to one of the on-board electrical system-side HV terminals and to a ground potential of the high-voltage system. The high-voltage system further comprises a switching device which, for the interconnection of the high-voltage energy store and the high-voltage on-board electrical system, is connected to the store-side and on-board electrical system-side HV terminals, and a discharge device for discharging the capacitor assembly.

The discharge device comprises at least one discharge resistor which is connected to the on-board electrical system-side HV terminals, and one passive discharge circuit per Y-capacitor. The discharge circuits are designed to discharge the Y-capacitors which, as a result of parasitic high-resistance connections of the on-board electrical system-side HV terminals and the ground potential with the store-side HV terminals, may be charged, even where the switching device is open. To this end, the discharge circuits respectively comprise at least one diode, wherein the diodes are poled in a blocking direction with respect to a normal polarity of voltages dropping across the Y-capacitors when the switching device is closed. The at least one diode of a discharge circuit can be poled in the forward direction by means of a voltage polarity changeover on the associated Y-capacitor, in order to discharge the Y-capacitors, wherein the polarity changeover is generated by the charging of the Y-capacitors and by the potential coupling of the on-board electrical system-side HV terminals caused by the discharge resistor.

The invention further relates to a motor vehicle having a high-voltage system according to the invention. However, the high-voltage system can also be employed for other applications, which are not motor vehicle-specific. The motor vehicle is an electrified motor vehicle, and comprises the high-voltage energy store of the high-voltage system in the form of a traction battery. The high-voltage energy store comprises a plurality of mutually interconnected or demand-actuated interconnectable energy storage cells. The store-side high-voltage terminals—HV terminals for short—or poles of the high-voltage energy store conduct a high-voltage potential, and are connected to the switching device. The switching device can be arranged on-board or off-board the store, for example in a relay box. The switching device can comprise HV relays or contactors wherein, in each case, a contactor is electrically connected to a store-side HV terminal. The switching device can form part of a so-called changeover matrix, wherein individual storage units of the high-voltage store can be interconnected in series or in parallel, in a demand-actuated manner.

In particular, the high-voltage system comprises a monitoring device for monitoring the switching device, by means of which a high-resistance bypass of the switching device is enabled, even in the open state. In particular, the monitoring device is designed to detect so-called contact sticking, i.e. an unwanted low-resistance connection between the high-voltage energy store and the high-voltage on-board electrical system associated with the fusion of the switching contacts of the switching device. The monitoring device can comprise, for example, measuring resistors which are parallel-connected to the contactors. By means of these measuring resistors, a permanent high-resistance connection is provided between the high-voltage energy store and the high-voltage on-board electrical system, even when the switching device is open.

The high-voltage on-board electrical system comprises on-board electrical system-side HV terminals, which are connected by means of the switching device to the store-side HV terminals. In the closed state of the switching device, the high-voltage potential which is applied to the store-side HV terminals is also applied to the on-board electrical system-side HV terminals. The high-voltage on-board electrical system can comprise a plurality of high-voltage components, for example a traction machine and other high-voltage loads, and a charging terminal for connecting to an off-board vehicle charging station. The high-voltage on-board electrical system moreover comprises the capacitor assembly, having the X-capacitor and the two Y-capacitors. The capacitors, at least in part, can be interference-suppression capacitors of a filter device of the high-voltage on-board electrical system. The capacitors, at least in part, can also be parasitic, structurally-related capacitances of the high-voltage on-board electrical system. The X-capacitor can combine all parasitic and non-parasitic capacitances which are connected between the on-board electrical system-side HV terminals, and which thus assume no connection with the ground potential. A first Y-capacitor can combine all parasitic and non-parasitic capacitances which are connected to a first, for example a positive on-board electrical system-side HV terminal, and to the ground potential. A second Y-capacitor can combine all parasitic and non-parasitic capacitances which are connected to a second, for example a negative on-board electrical system-side HV terminal, and to the ground potential.

The high-voltage system moreover comprises, on the store side and on the on-board electrical system side, parasitic insulation resistances, which form high-resistance electrical connections between the HV terminals and the ground potential. These insulation resistances can assume inconsistent ageing, such that a voltage on the insulation resistances is asymmetrically distributed, and the insulation resistances thus constitute a load imbalance. As the insulation resistances are parallel-connected to the Y-capacitors, a load imbalance-related voltage asymmetry also affects a voltage on the Y-capacitors, and thus an energy content of the Y-capacitors. If the energy content of at least one of the Y-capacitors exceeds a stipulated threshold value, this may result in an endangerment of persons by contact with a HV potential.

The high-voltage system comprises a discharge device for discharging the capacitors. For discharging the X-capacitor, at least one discharge resistor is provided, which is connected between the on-board electrical system-side HV terminals, and is thus parallel-connected to the X-capacitor. This at least one discharge resistor discharges the X-capacitor further to the opening of the switching device, and thus reduces the voltage which is applied to the X-capacitor and, in consequence, the energy content of the X-capacitor. As the at least one discharge resistor is permanently connected to the on-board electrical system-side HV terminals, and as a resistance value of the discharge resistor is significantly lower than a resistance value of the insulation resistances, for example in the kiloohm range, a low-resistance coupling is in force between the high-voltage potentials.

In the normal operation of the high-voltage system, with the switching device closed, this low-resistance coupling is such that voltages which are applied to the Y-capacitors, i.e. the voltage dropping across the respective HV terminal and the ground potential, are of the same polarity. This polarity of voltages on the Y-capacitors in the normal operation of the high-voltage system is described here as the normal polarity. However, immediately the Y-capacitors are charged, as a result of the parasitic, for example contactor-bypassing, high-resistance connection between the store-side HV terminals and the on-board electrical system-side HV terminals, and as a result of the parasitic, insulation resistance-related high-resistance connection between the HV terminals and the ground potential, the polarity of one of the voltages on the Y-capacitors is reversed, on the grounds of the potential coupling which is dictated by the discharge resistor. This voltage polarity reversal on one of the Y-capacitors is employed by the discharge circuits of the discharge devices.

The discharge circuits respectively comprise a diode. In particular, each discharge circuit comprises a cascade arrangement of at least two diodes. In the interests of voltage symmetry, each diode can respectively comprise a parallel-connected resistor. A first discharge circuit is connected to the first on-board electrical system-side HV terminal, and to the ground potential. The second discharge circuit is connected to the second on-board electrical system-side HV terminal, and to the ground potential. The discharge circuits are thus parallel-connected to one Y-capacitor respectively. In each discharge circuit, the at least one diode is arranged such that, with the normal voltage polarity on the associated Y-capacitor, it is poled in the blocking direction. Immediately the Y-capacitors are charged, and the voltage on one of the Y-capacitors undergoes a polarity reversal in response to the potential coupling caused by the discharge resistor, the at least one diode of the parallel-connected discharged circuit is poled in the forward direction, and discharges the Y-capacitors. The diodes thus reduce voltages on the Y-capacitors, and thus the quantities of energy stored in the Y-capacitors. As the quantity of energy increases quadratically with the voltage, the reduction of voltages for the reduction of quantities of energy in the Y-capacitors is significantly more efficient than the reduction of the capacitances of Y-capacitors. As the discharge circuits are passively configured, and a discharge circuit will invariably respond to the charging of the Y-capacitors, no detection of charging is required, and thus no deliberate actuation of the discharge circuits. The discharge device is thus configured in a particularly simple and cost-effective manner.

It has proved to be advantageous if each discharge circuit comprises at least one protection diode, for example a Z-diode or a suppressor diode which, with respect to the normal polarity of the respective voltage, is poled in the forward direction, and which executes polarity reversal protection up-circuit of any polarity reversal which is provided by an earth-leakage monitor of an off-board charging station. By means of the at least one protection diode, up-circuit of which, for the purposes of component protection, a series resistor is preferably connected, the discharge circuits are tolerant of a voltage polarity reversal which is imposed by the earth-leakage monitor, for example by a displacement of the ground potential.

Embodiments proposed with respect to the high-voltage system according to the invention, and the advantages thereof, apply correspondingly to the motor vehicle according to the invention.

Further features of the invention proceed from the claims, the figures and the description of the figures. Features and combinations of features specified in the preceding description, and in the description of the figures hereinafter, and/or features and combinations of features which are illustrated in the figures alone, are not only applicable in the respectively indicated combination, but also in other combinations, or in isolation.

BRIEF DESCRIPTION OF THE DRAWINGS

The invention is described in greater detail hereinafter with respect to a preferred exemplary embodiment, and with reference to the drawings. In the drawings.

In the figures, identical and functionally identical elements are identified by the same reference symbols.

DETAILED DESCRIPTION OF THE DRAWINGS

Figure 1:
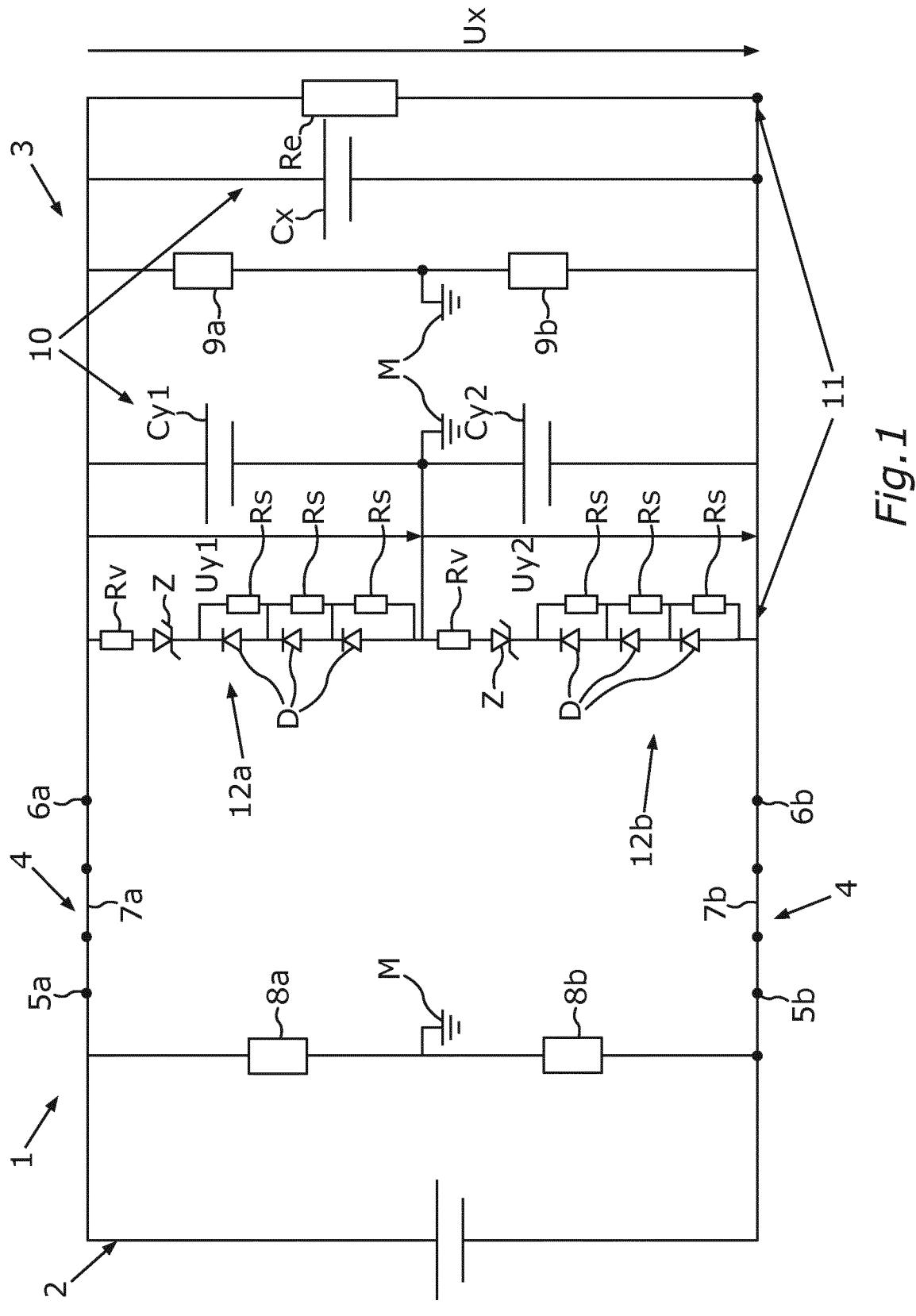
FIG. 1 shows an exemplary representation of a circuit diagram of a high-voltage system of a motor vehicle, in normal operation.
Figure 2:
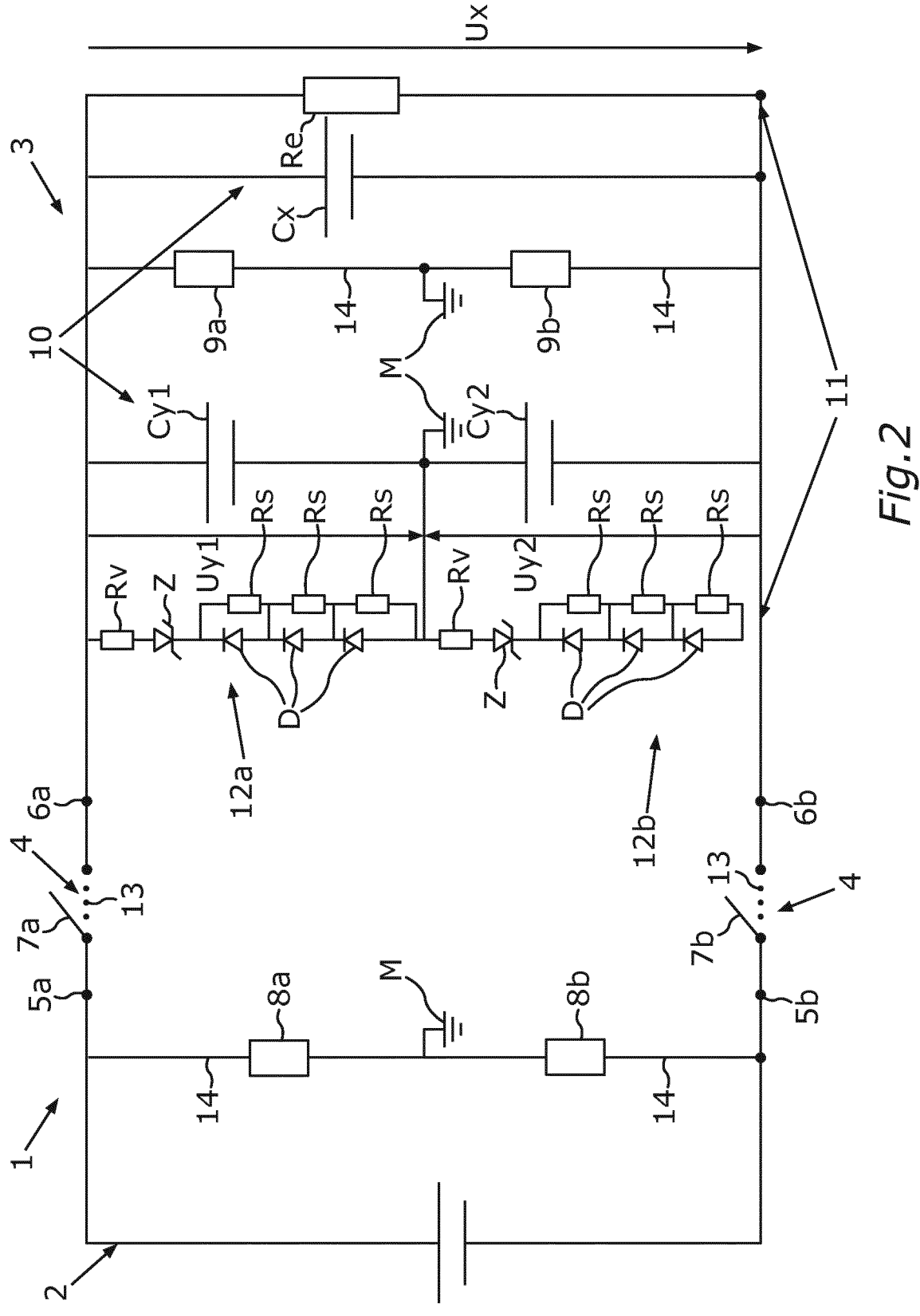
FIG. 2 shows a high-voltage system according to FIG. 1, in a discharge operation of Y-capacitors of the high-voltage system.

FIG. 1 and FIG. 2 show a high-voltage system 1 for an electrically powered vehicle. The high-voltage system 1 comprises a high-voltage electrical energy store 2 and a high-voltage on-board electrical system 3. The high-voltage energy store 2 and the high-voltage on-board electrical system 3 can be interconnected via a switching device 4. To this end, store-side HV terminals 5a, 5b and on-board electrical system-side HV terminals 6a, 6b are connected to contactors 7a, 7b of the switching device 4. In FIG. 1, the contactors 7a, 7b are closed, such that the high-voltage energy-store 2 and the high-voltage on-board electrical system 3 are electrically connected. In FIG. 2, the contactors 7a, 7b are open, such that the high-voltage energy store 2 and the high-voltage on-board electrical system 3 are disconnected. Both the high-voltage energy store 2 and the high-voltage on-board electrical system 3 incorporate parasitic insulation resistances 8a, 8b, 9a, 9b, which are connected to the HV terminals 5a, 5b, 6a, 6b, and to a ground potential M of the motor vehicle. The store-side insulation resistances 8a, 8b are connected to the respective store-side HV terminals 5a, 5b, and the on-board electrical system-side insulation resistances 9a, 9b are connected to the respective on-board electrical system-side HV terminals 6a, 6b, and to the ground potential M.

The high-voltage on-board electrical system 3 moreover comprises a capacitor assembly 10, which comprises an X-capacitor Cx and two Y-capacitors Cy1, Cy2. The capacitors Cx, Cy1, Cy2 can be embodied, for example, in the form of deliberately incorporated capacitors and/or in the form of parasitic capacitances. The X-capacitor Cx is connected to the on-board electrical system-side HV terminals 6a, 6b. The first Y-capacitor Cy1 is connected to the first on-board electrical system-side positive HV terminal 6a, and to the ground potential M. The second Y-capacitor Cy2 is connected to the second on-board electrical system-side negative HV terminal 6b, and to the ground potential M. The HV terminals 5a, 5b, 6a, 6b thus assume, via the insulation resistances 8a, 8b, 9a, 9b and the Y-capacitors Cy1, Cy2, an electrical connection to the ground potential M.

For discharging the capacitors Cx, Cy1, Cy2, with the switching device 4 open, the high-voltage system 1 comprises a discharge device 11. The discharge device 11 comprises a discharge resistor Re, which is parallel-connected to the X-capacitor Cx. This discharge resistor Re moreover couples the potentials of the on-board electrical system-side HV terminals 6a, 6b, in a low-resistance arrangement. For discharging the Y-capacitors Cy1, Cy2, the discharge device 11 comprises two passive discharge circuits 12a, 12b, wherein a first discharge circuit 12a is parallel-connected to the first Y-capacitor Cy1, and is thus connected to the first on-board electrical system-side HV terminal 6a and to the ground potential M. A second discharge circuit 12b is parallel-connected to the second Y-capacitor Cy2, and is connected to the second on-board electrical system-side terminal 6b and to the ground potential M.

Moreover, in FIG. 1, voltages Ux, Uy1, Uy2 which are applied to the capacitors Cx, Cy1, Cy2 in the closed state of the switching device 4 are represented. As a result of the coupling of the on-board electrical system-side HV terminals 6a, 6b which is provided via the discharge resistor Re, voltages Uy1, Uy2 applied to the Y-capacitors Cy1, Cy2 assume the same polarity. Each of the discharge circuits 12a, 12b comprises a cascade arrangement of diodes D which, with respect to the voltages Uy1, Uy2, are poled in the blocking direction, such that the discharge circuits 12a, 12b, in the normal operation of the high-voltage system 1 with the switching device 4 closed, and thus with the normal polarity of voltages Uy1, Uy2, are inactive.

If the switching device 4, as represented in FIG. 2, is then opened, a high-resistance connection 13 between the HV terminals 5a, 5b, 6a, 6b can nevertheless be in force, in this case via the contactors 7a, 7b. This can occur, for example as a result of age-related particle deposits on the contactors 7a, 7b, which shorten a clearance and creepage distance between the switching contacts of the contactors 7a, 7b. This high-resistance connection 13 can also be provided by a monitoring device, which is not represented here, which monitors switching processes of the contactors 7a, 7b and is configured, for example, to detect an unwanted contact fusion of the switching contacts of the contactors 7a, 7b. Moreover, high-resistance connections 14 are in force between the HV terminals 5a, 5b, 6a, 6b and the ground potential M, as a result of the insulation resistances 8a, 8b, 9a, 9b. These high-resistance connections 13, 14 can result in a charging of the Y-capacitors Cy1, Cy2, even in an open state of the switching device 4.

Upon the charging of the Y-capacitors, the coupling of the HV terminals 5a, 5b provided by the discharge resistor Re is such that one of the voltages Uy1, Uy2, in the present case Uy2, undergoes a reversal of potential. Which of the voltages Uy1, Uy2 undergoes a reversal of potential is dependent upon the ratio of the insulation resistances 8a, 8b, 9a, 9b, and upon a resistance value of the high-resistance connection 13. This reversal of potential ensures that the diodes D of one of the discharge circuits 12a, 12b, in the present case the diodes D of the discharge circuit 12b which is parallel-connected to the second Y-capacitor Cy2, are poled in the forward direction, and the decay of voltages Uy1, Uy2 on the Y-capacitors Cy1, Cy2 ensues accordingly. The Y-capacitors Cy1, Cy2 are thus discharged from the side which undergoes the reversal of potential. In the interests of the voltage symmetry of voltages dropping across the diodes D, a resistor Rs is respectively parallel-connected to each diode D. Moreover, each discharge circuit 12a, 12b comprises a Z-diode Z, for example a 60 V Z-diode, up-circuit of which a series resistor Rv is arranged in each case and which is designed to protect against a polarity reversal of the high-voltage system 1 dictated by an earth-leakage monitor of an off-board charging station, which is not represented here.

The invention claimed is:

1. A high-voltage system for a motor vehicle, comprising:
a high-voltage electrical energy store with store-side HV terminals;
a high-voltage on-board electrical system having on-board electrical system-side HV terminals, and a capacitor assembly including an X-capacitor, which is connected to the on-board electrical system-side HV terminals, and two Y-capacitors, which are respectively connected to one of the on-board electrical system-side HV terminals and to a ground potential of the high-voltage system;
a switching device which, for the interconnection of the high-voltage energy store and the high-voltage on-board electrical system, is connected to the store-side and on-board electrical system-side HV terminals; and

a discharge device configured to discharge the capacitor assembly;
wherein:
the discharge device comprises a discharge resistor which is connected to the on-board electrical system-side HV terminals, and one passive discharge circuit per Y-capacitor;
the discharge circuits are designed to discharge the Y-capacitors which, as a result of parasitic high-resistance connections of the on-board electrical system-side HV terminals and the ground potential with the store-side HV terminals, are charged, even where the switching device is open, to which end the discharge circuits respectively comprise at least one diode;
the diodes are poled in a blocking direction with respect to a normal polarity of voltages dropping across the Y-capacitors when the switching device is closed; and
the at least one diode of a discharge circuit can be poled in the forward direction by means of a voltage polarity changeover on the associated Y-capacitor, in order to discharge the Y-capacitors, wherein the polarity changeover is generated by the charging of the Y-capacitors and by the potential coupling of the on-board electrical system-side HV terminals caused by the discharge resistor.

2. The high-voltage system of claim 1, wherein the high-voltage system comprises a monitoring device configured to monitor the switching device, by means of which a high-resistance bypass of the switching device is enabled, even in the open state.

3. The high-voltage system of claim 1, wherein the capacitors, at least in part, are embodied by interference-suppression capacitors of a filter device of the high-voltage on-board electrical system.

4. The high-voltage system of claim 1, wherein the capacitors, at least in part, are embodied by parasitic capacitances of the high-voltage on-board electrical system.

5. The high-voltage system of claim 1, wherein each discharge circuit comprises a cascade arrangement of at least two diodes.

6. The high-voltage system of claim 4, wherein each diode respectively comprises a parallel-connected resistor, in the interests of voltage symmetry on the diodes of the respective cascade arrangement.

7. The high-voltage system of claim 1, wherein each discharge circuit comprises at least one protection diode which, with respect to the normal polarity of the voltages, is poled in the forward direction, and which executes polarity reversal protection up-circuit of any polarity reversal which is provided by an earth-leakage monitor of an off-board charging station.

8. A motor vehicle having a high-voltage on-board electrical system according to claim 1.

* * * * *